United States Patent

Schiffmann

(10) Patent No.: US 6,678,631 B2
(45) Date of Patent: Jan. 13, 2004

(54) VEHICLE ATTITUDE ANGLE ESTIMATOR AND METHOD

(75) Inventor: Jan K. Schiffmann, Newbury Park, CA (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/092,037

(22) Filed: Mar. 6, 2002

(65) Prior Publication Data

US 2002/0128795 A1 Sep. 12, 2002

Related U.S. Application Data

(63) Continuation-in-part of application No. 09/196,380, filed on Nov. 19, 1998, now Pat. No. 6,292,759.

(51) Int. Cl.⁷ .......................... G01C 17/00; B30R 16/02
(52) U.S. Cl. .......................... 702/151; 340/440; 701/35; 701/36; 701/38; 701/45; 701/110
(58) Field of Search ............................. 702/150, 151, 702/152, 153; 701/4, 36, 37, 38, 41, 42, 43, 44, 45, 46; 340/429, 436, 440

(56) References Cited

U.S. PATENT DOCUMENTS

| 4,834,205 | A | 5/1989 | Mizuno et al. ............. 180/141 |
| 5,684,456 | | 11/1997 | Walter ........................ 340/440 |
| 5,684,698 | * | 11/1997 | Fujii et al. ..................... 701/38 |
| 6,002,974 | | 12/1999 | Schiffmann .................. 701/36 |
| 6,002,975 | * | 12/1999 | Schiffmann et al. .......... 701/36 |
| 6,038,495 | | 3/2000 | Schiffmann ..................... 701/1 |
| 6,055,472 | | 4/2000 | Breunig et al. ............... 701/45 |
| 6,073,065 | | 6/2000 | Brown et al. ................. 701/36 |
| 6,104,284 | | 8/2000 | Otsuka ........................ 340/440 |
| 6,141,604 | | 10/2000 | Mattes et al. ................... 701/1 |

FOREIGN PATENT DOCUMENTS

| DE | 19606043 A1 | 2/1996 | ........... G01C/9/08 |
| DE | 19609176 A1 | 3/1996 | ........... B60R/21/32 |
| DE | 19609717 A1 | 3/1996 | ........... B60R/21/32 |

* cited by examiner

*Primary Examiner*—John Barlow
*Assistant Examiner*—John Le
(74) *Attorney, Agent, or Firm*—Jimmy L. Funke; Stefan V. Chmielewski

(57) ABSTRACT

An attitude angle estimator and method of estimating attitude angle of a vehicle having an angular attitude rate sensor sensing angular attitude rate of a vehicle, a vertical accelerometer sensing vertical acceleration, and a lateral accelerometer sensing lateral acceleration. An attitude angle estimate is produced and is updated as a function of the sensed angular attitude rate. An acceleration-based attitude angle is determined as a function of the sensed accelerations, and a blending coefficient is provided. A current vehicle attitude angle estimate is generated as a function of the updated attitude angle estimate, the acceleration-based attitude angle, and the blending coefficient.

21 Claims, 9 Drawing Sheets

VEHICLE ATTITUDE ANGLE ESTIMATOR AND METHOD

CROSS-REFERENCE TO RELATED APPLICATION

This application is a continuation-in-part of U.S. patent application Ser. No. 09/196,380, filed Nov. 19, 1998 now U.S. Pat. No. 6,292,759, entitled "VEHICLE ATTITUDE ANGLE ESTIMATION USING SENSED SIGNAL BLENDING." The aforementioned related application is hereby incorporated by reference.

TECHNICAL FIELD

The present invention generally relates to vehicle attitude angle sensing, and more particularly, to low-cost attitude (e.g., roll) angle estimation using signal blending for use in a vehicle.

BACKGROUND OF THE INVENTION

Automotive vehicles are increasingly employing safety-related devices that deploy in the event that the vehicle rolls over to provide added protection to the occupants of the vehicle. For example, upon detecting a vehicle rollover condition, a pop-up roll bar can be deployed such that, when activated, the roll bar further extends vertically outward to increase the height of support provided by the roll bar. Other controllable features may include actuating deployment of one or more air bags, such as front or side deployment air bags, or actuating a pretensioner to pretension a restraining device, such as a seat belt or safety harness, to prevent occupants of the vehicle from ejecting from the vehicle or colliding with the roof of the vehicle.

In the past, basic rollover sensors have been employed in automotive vehicles to measure the angular position of the vehicle from which a rollover condition can be determined. The basic rollover sensors have included the use of a pendulum normally hanging vertically downward due to the Earth's gravitational force. Many basic automotive sensing devices are employed simply to monitor the angular position of the vehicle relative to a level ground horizontal position. As a consequence, the basic automotive vehicle rollover sensors have generally been susceptible to error when the vehicle travels around a turn or becomes airborne, in which case the Earth's gravitational force, which the sensor relies on, may be overcome by other forces.

More recently, sophisticated rollover sensing approaches have been considered. One such approach considered for rollover and pitchover sensing requires the use of six sensors including three accelerometers and three angular rate sensors, also referred to as gyros, all of which are employed together for use in an inertial navigation system which tracks position and attitude of the vehicle. The three accelerometers generally provide lateral, longitudinal, and vertical acceleration measurements of the vehicle, while the three gyros measure pitch rate, roll rate, and yaw rate. In sensing a rollover condition, the system determines a vehicle roll angle. However, the more sophisticated conventional rollover sensing approaches generally require a large number of high-precision and expensive sensors. In addition, known sophisticated systems are often susceptible to cumulative drift errors, and therefore must be reset occasionally.

It should be appreciated that various other applications may require knowledge of an attitude angle of the vehicle as the vehicle maneuvers on the ground. For example, attitude angle estimators may be employed to provide a roll angle indication to the driver of the vehicle. In the past, attitude angle estimators have employed one or more accelerometers and an angular rate sensor for each axis of rotation of the vehicle. However, there exists the problem of how to combine angle-related information sensed by the accelerometer and angular rate sensor in order to obtain an overall attitude angle measurement. This is because each type of sensor generally has characteristic failings in the conventional applications. For example, the accelerometer-based attitude angle estimate is generally relatively noisy when the vehicle is traveling on a rough road surface, and may sustain large errors whenever the vehicle's trajectory involves an inertial acceleration having a component perpendicular to the rotational axis under consideration. In addition, the angular rate sensor estimate, which is typically obtained by integrating the sensed angular rate signal, generally has a tendency to drift with an ever-increasing error due to unknown bias or offset in the sensed angular rate signal.

It is therefore desirable to provide for an attitude angle estimator that provides an estimation of the attitude angle of a vehicle and minimizes errors that may be present in automotive-grade sensors. It is also desirable to provide for an attitude angle estimator that combines sensed signals measuring vehicle dynamics to obtain an overall more accurate attitude angle estimation. It is further desirable to provide for a vehicle roll angle estimator that minimizes the effects of noise present in an accelerometer-based angle estimate, and minimizes errors present in an angular rate sensed signal.

SUMMARY OF THE INVENTION

In accordance with the teachings of the present invention, an attitude angle estimator and method of estimating attitude (e.g., roll) angle of a vehicle are provided for estimating the attitude angle. The attitude angle estimator employs an angular attitude rate sensor for sensing angular attitude rate of a vehicle and producing an output signal, a first accelerometer for sensing vertical acceleration of the vehicle and producing an output signal, and a second accelerometer for detecting horizontal (e.g., lateral) acceleration of the vehicle and producing an output signal. A controller determines an acceleration-based attitude angle as a function of the sensed vertical and horizontal accelerations, and further determines an attitude angle estimate as a function of the angular attitude rate and the acceleration-based attitude angle.

The method for estimating an attitude angle of a vehicle according to the present invention includes the steps of sensing angular attitude rate of the vehicle and producing an output signal, sensing vertical acceleration of the vehicle and producing an output signal, and sensing lateral acceleration of the vehicle and producing an output signal. The method also includes the step of determining an acceleration-based attitude angle as a function of the sensed vertical and lateral accelerations. The method further includes the step of determining an attitude angle estimate as a function of the sensed angular rate signal and the acceleration-based attitude angle.

These and other features, advantages and objects of the present invention will be further understood and appreciated by those skilled in the art by reference to the following specification, claims and appended drawings.

DETAILED DESCRIPTION OF THE PREFERRED EMBODIMENTS

Figure 1:
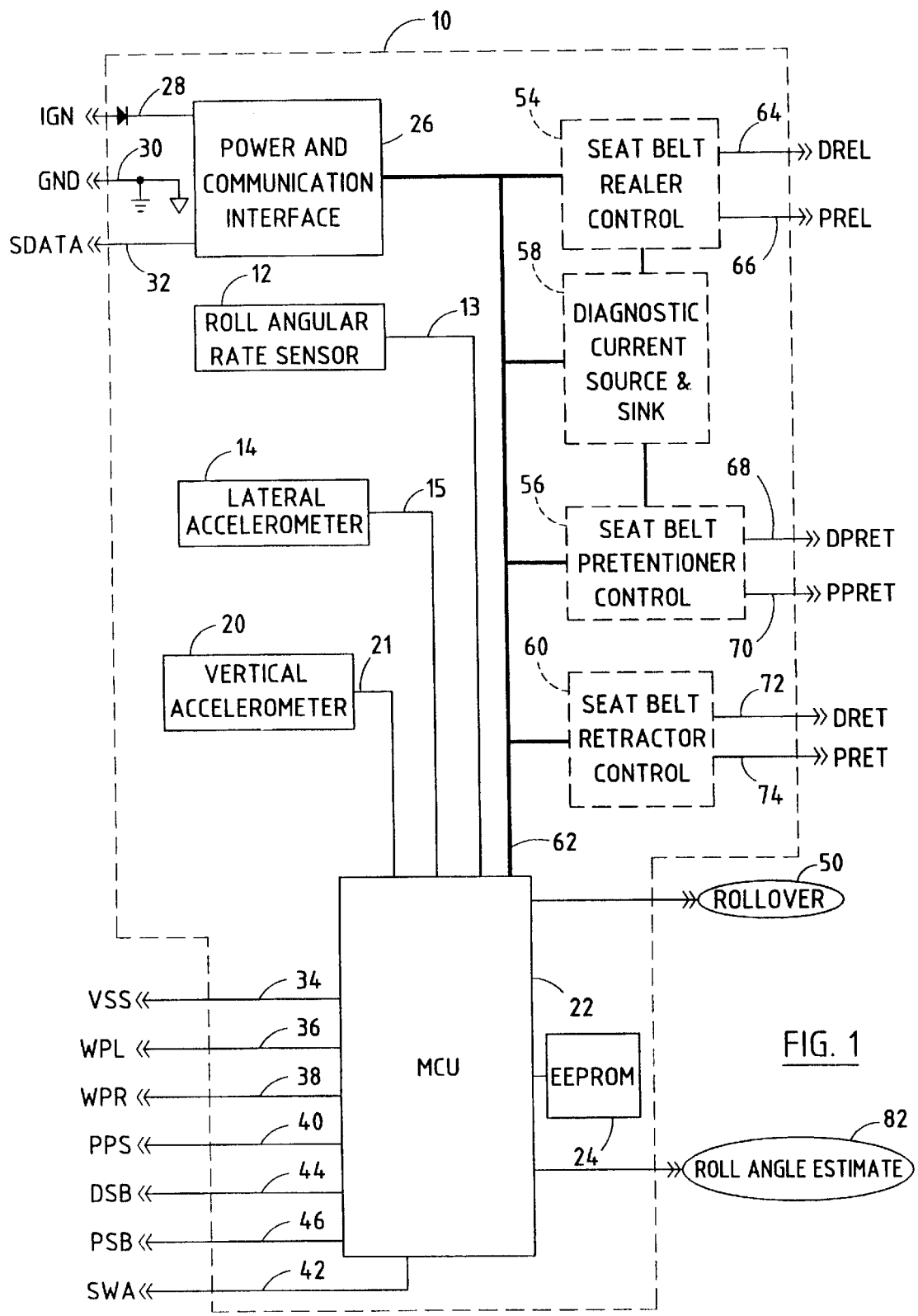
FIG. 1 is a block diagram of an attitude angle estimator/rollover sensing module for estimating vehicle roll angle according to the present invention, and for further predicting vehicle rollover.

Referring to FIG. 1, a vehicle angle estimator/rollover sensing module 10 is illustrated for use in sensing vehicle attitude angular rate and vertical and lateral acceleration dynamics, estimating angular roll angle, and predicting a rollover condition of an automotive vehicle (not shown). The sensing module 10 of the present invention is preferably mounted on an automotive vehicle and used to estimate the roll attitude angle according to the example shown, and may further predict a future rollover condition of the vehicle. The attitude angle estimation shown and described herein is a roll angle estimation which is the angular side-to-side rotation about the vehicle's longitudinal axis. However, it should be appreciated that the attitude angle estimation may include a pitch angle estimation which is a front-to-back angular rotation about the vehicle's lateral axis, or may be used to determine both roll and pitch angle estimations. A vehicle rollover condition, as described herein in connection with the present invention, may include side-to-side rotation of the vehicle about the vehicle's longitudinal axis, commonly referred to as a "vehicle rollover," and back-to-front rotation about the vehicle's lateral axis, commonly referred to as a "vehicle pitchover," or a combination of rollover and pitchover. For purposes of describing the rollover sensing of the present invention, the term "rollover" is generally used to refer to either a rollover condition or a pitchover condition.

The sensing module 10 is designed to be located in an automotive vehicle to sense vehicle dynamics, estimate the roll attitude angle, and predict a rollover condition of the vehicle. Upon predicting a vehicle rollover condition, the sensing module 10 provides an output signal indicative of the predicted rollover condition. The rollover condition output signal may be supplied to one or more selected vehicle devices, such as safety-related devices, to actuate the selected devices in anticipation of an upcoming rollover event. The predicted rollover condition output signal may be employed to deploy a pop-up roll bar to provide extended lateral support to the occupants of the vehicle just prior to the actual vehicle rollover occurring. Similarly, the predicted rollover condition output signal may actuate an occupant restraining device, such as a seat belt or safety harness pretensioner to eliminate slack in the restraining device just prior to the vehicle rollover occurring. Other controlled functions include deployment of front and/or side deployment air bags to protect the vehicle occupants during a vehicle rollover. These and other devices may be controlled in response to the rollover condition output signal.

The sensing module 10 shown herein includes three sensors, all preferably assembled together on module 10, and oriented to perform the intended sensing operation. The sensors include a roll angular rate sensor 12, a lateral accelerometer 14, and a vertical accelerometer 20. The roll angular rate sensor 12 measures the time rate of angular roll 13 about the vehicle's longitudinal axis. The lateral accelerometer 14 measures acceleration 15 of the vehicle along the vehicle's horizontal lateral axis. The vertical accelerometer 20 measures the acceleration 21 of the vehicle along the vehicle's vertical axis.

The sensing module 10 further includes a microprocessor control unit (MCU) 22 for processing sensed vehicle parameters according to an attitude angle estimation algorithm as described herein, and may further include a rollover detection algorithm to predict a vehicle rollover condition. MCU 22 is preferably a microprocessor-based controller and, according to one example, may include Model No. HC12 made available by Motorola. Associated with MCU 22 is an electrically erasable programmable read-only memory (EEPROM) 24 that stores various programmed calibrations for performing the attitude angle estimation algorithm, and may further store programmed calibrations for the rollover sensing algorithm. The EEPROM 24 can be integrated with the MCU 22 or provided external thereto. Sensing module 10 further includes a power and communication interface 26 for receiving an ignition IGN1 signal on line 28 and communicating via serial data (SDATA) on serial data bus 32. Sensing module 10 is further grounded via ground line 30. Power and communication interface 26 converts an approximately 12-volt DC IGN1 signal input to 5-volts DC for use as a power supply to the components on module 10. SDATA communicated on data bus 32 may include individual sensor outputs and processor outputs as well as programmed inputs.

MCU 22 also receives, as inputs, signals from each of sensors 12, 14, and 20. In addition, the MCU 22 may receive other various inputs that may be employed in connection with the attitude angle estimation and rollover predicting of the present invention. These inputs may include a vehicle speed sensor (VSS) signal 34 indicative of the speed of the vehicle and auxiliary left and right wheel position sensors (WPL) and (WPR) signals 36 and 38 for providing an indication of whether the wheels on either the left or right side of the vehicle are not in contact with the ground. The auxiliary wheel position sensor signals 36 and 38 are wheel position measurements taken relative to the body of the vehicle. Other inputs include a passenger presence (PPS) signal 40, which may be generated as a sensed output from an occupant presence sensor for purposes of sensing the presence of a passenger. A driver's seat belt (DSB) signal 44 and a passenger's seat belt (PSB) signal 46 indicate the use of driver and passenger seat belts, respectively. Also provided is a steering wheel angle (SWA) signal 42 for providing an indication of the current vehicle steering wheel angle relative to the longitudinal axis of the vehicle.

MCU 22 processes the various input signals and produces an output signal identified as ROLLOVER signal 50, which is indicative of a predicted vehicle rollover condition. In addition, MCU 22 provides the predicted rollover output signal on line 62 to control designated onboard control devices, such as a seat belt reeler control 54, a lap seat belt pretensioner control 56, and a seat belt retractor control 60. Seat belt reeler control 54 controls the seat belt reeler for both the driver's side and passenger's side via respective signals DREL and PREL as provided on output line 64 and 66, respectively. Seat belt pretensioner control 56 likewise controls seat belt pretensioning for the driver's side and passenger's side via signals DPRET and PPRET as provided on output lines 68 and 70, respectively. A diagnostic current source and sink 58 allows for diagnostic testing of the seat belt reeler control 54 and seat belt pretensioner 56. The seat belt retractor control 60 controls retractor locks associated with the seat belt to both the driver's seat belt and passenger's seat belt via signals DRET and PRET, as provided on output lines 72 and 74.

According to the present invention, MCU 22 processes the various input signals and produces an attitude angle output signal identified as roll angle estimate signal 82, which is indicative of an estimated vehicle roll angle. The estimated roll angle output signal 82 may be output to a display for displaying the current estimated roll angle of the vehicle for viewing by the vehicle occupants. The estimated roll angle 82 can be used to produce the rollover signal 50. Examples of rollover sensing modules for predicting a rollover condition of a vehicle are disclosed in U.S. Pat. Nos. 6,002,975, 6,002,974, and 6,038,495, each of which are hereby incorporated by reference. While an example of vehicle rollover sensing is provided herein, it should be appreciated that the roll angle estimator and method of the present invention may be employed for various other applications.

The vehicle attitude angle estimation of the present invention derives an acceleration-based angle from the lateral and vertical accelerometers, and combines the acceleration-based angle with an attitude angle derived from the angular rate signal to obtain an overall roll angle estimate. The present invention is described in the context of a blending process which combines acceleration-based angle information obtained from the lateral and vertical accelerometers 14 and 20 with angular rate information obtained from the roll angular rate sensor 12. According to this process, sensor measurements and roll angle estimation calculations occur at discrete time intervals, e.g., every 10 milliseconds. At each time interval, there is available a previous roll angle estimate $\hat{\phi}$. The measured roll rate P obtained from roll angular rate sensor 12 is used to obtain a time-updated roll angle estimate $\hat{\phi}^{(-)}$. The time-updated estimated $\hat{\phi}^{(-)}$ is measurement-updated by blending in the latest acceleration-based roll angle $\phi^a$ obtained by processing the vertical and lateral acceleration signals.

The acceleration-based angle $\phi^a$ effectively nudges the time-updated estimate slightly towards the acceleration-based angle $\phi^a$. The effect of the blending is that the roll angular rate signal is integrated to give the roll angle estimate but, in the long run, the roll angle is kept in check by the accelerometer-based estimate. As a consequence of the blending process, the accelerometer-based angle $\phi^a$ is effectively low-pass filtered so that noise is reduced or eliminated from the overall estimate, yet there preferably is no filtering lag associated with the blending process if the roll angular rate and accelerometers agree on what the roll angle should be. Use of the blending process results in a constant steady state error, if any, in the roll angle estimate due to the roll angular rate sensor bias, instead of an ever-increasing ramp error. It should be appreciated that the blending time coefficient K is adaptively adjustable to give priority to one sensor set (roll rate sensor or accelerometers) over the other when appropriate. In addition, rough roads and airborne conditions are examples of conditions when the accelerometers are preferably ignored by setting the blending time coefficient K to a small value, such as zero, for a time period.

Figure 2:
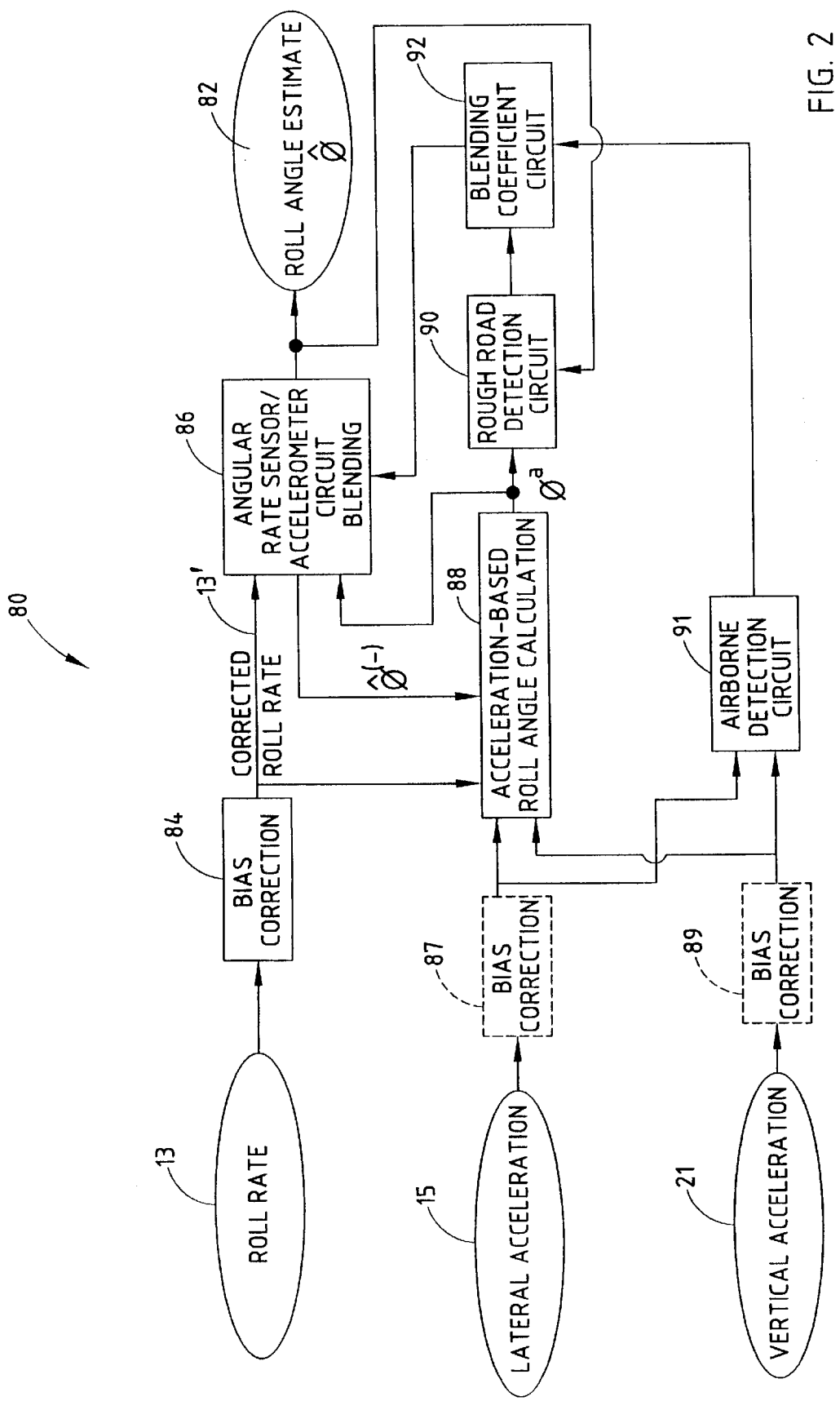
FIG. 2 is a block diagram illustrating a roll angle estimator for estimating the roll angle of a vehicle according to the present invention.

Referring to FIG. 2, implementation of a roll angle estimator 80 is illustrated therein for estimating the roll angle by sensing the roll rate signal 13 generated by roll angular rate sensor 12, the lateral acceleration signal 15 generated by lateral accelerometer 14, and the vertical acceleration signal 21 generated by vertical accelerometer 20. Roll angle estimator 80 includes bias correction circuit 84 for providing bias correction to the measured roll rate signal 13. Additionally, bias correction circuit 87 provides bias correction to the measured lateral acceleration signal 15, and bias correction circuit 89 provides bias correction to the measured vertical acceleration signal 21. Bias-correction circuit 84 preferably includes a low-pass filter that produces an average value over a designated period of time which, for example, may include two minutes, and further subtracts the low-pass filter output from the measured signals to produce the bias-corrected signals.

Roll angle estimator 80 also includes an acceleration-based roll angle calculation circuit 88 which receives the bias-corrected lateral acceleration signal 15, the bias-corrected vertical acceleration signal 21, the bias-corrected roll rate signal 13, and the time-updated estimated roll angle signal $\phi^{(-)}$, and in response thereto, calculates an accelerometer-based roll angle $\phi^a$. A rough road detection circuit 90 monitors the acceleration-based roll angle $\phi^a$ and determines if a rough road condition exists that affects, to a certain degree, lateral side-to-side motion of the vehicle. This may be accomplished by rough road detection circuit 90 comparing the current acceleration-based roll angle $\phi^a$ with the previous acceleration-based roll angle and the last determined roll angle, and, if there is substantial disagreement in the comparison, rough road detection circuit 90 produces a rough road condition signal. A blending coefficient circuit 92 is provided for generating the roll blending coefficient K which determines the proportion of signal blending between the accelerometer-based roll angle calculation $\phi^a$ and the time-updated roll angle estimate which is partially derived from the sensed angular roll rate. An airborne detector 91 monitors the bias-corrected lateral acceleration signal 15 and vertical acceleration signal 21 and determines if an airborne condition exists. If a rough road condition or airborne condition is detected, the blending coefficient K is preferably set to zero or near zero so that the roll angle estimate 82 ignores the accelerometer-based roll angle $\phi^a$.

The roll angle estimator 80 also includes an angular rate sensor/accelerometer blending circuit 86. Blending circuit 86 receives the bias-corrected roll rate 13' and the accelerometer-based roll angle $\phi^a$, as well as the roll blending coefficient K. Angular rate sensor/accelerometer blending circuit 86 contains a discrete-time blending algorithm which determines the overall roll angle estimate 82 as a function of the time-updated measurement angle, the accelerometer-based roll angle $\phi^a$, and the roll blending coefficient K. The discrete-time blending algorithm is explained in more detail hereinafter in connection with the roll angle estimate methodology of FIGS. 4A and 4B.

The roll angle estimate 82 produced by roll angle estimator 80 provides an estimated value of the vehicle's roll angle about the horizontal longitudinal axis of the vehicle only. While a single-axis roll angle estimator is shown and described herein, it should be understood that the teachings of the present invention may likewise provide for a pitch angle estimator which, instead of sensing the roll rate signal and lateral acceleration signal, preferably senses a pitch rate signal and a longitudinal acceleration signal and determines a pitch blending coefficient to estimate a pitch angle. It should also be appreciated that a dual-axes roll and pitch estimator may be provided having the same features of the roll angle estimator 80 shown and described herein, with the addition of other inputs.

It should further be appreciated that the attitude angle estimator 80 can be implemented by digital processing of software with the MCU 22 on sensing module 10. While individual features of the estimator 80 are shown and described herein as circuits, such features can be implemented in analog circuitry or performed by digital processing carried out in accordance with programmed algorithms.

With the blending scheme, transient error present in the acceleration-based angle estimate is low-pass filtered, so the roll blending coefficient K is adjusted to a value which is an optimal tradeoff between ignoring the transient errors and having immunity to unknown angular rate sensor biases. Accordingly, the roll blending coefficient K is variable in that it may be adjusted for transient errors or drift present in the accelerometers and the angular rate sensors which are employed to provide the overall roll angle estimate.

The signal blending according to the present invention includes recording a measurement-updated angle estimate, integrating the measured angular roll rate signal 13 to obtain a change in angle value, and providing a time-updated angle estimate. The time-updated angle estimate is blended with the acceleration-based angle $\phi^a$ to determine the roll angle estimate. The blending employed in the angular rate sensor/acceleration blending circuit 86 provides for a discrete-time blending algorithm which may be represented by the following equations.

$$\phi^{(-)} = \phi^{(+)} + \Delta T \cdot P$$

$$\phi^{(+)} = \phi^{(-)} + K(\phi^a - \phi^{(-)})$$

Where $\phi^{(-)}$ is the time-updated angle estimate at the next time which is equal to the measurement-update angle estimate $\phi^{(+)}$ at the previous time instant summed with the integration of the measured angular rate P. The measured angular rate integration is equal to the product of the measured angular rate P and the discrete-time interval $\Delta T$ which is the difference between the previous and current time periods. As shown in the latter equation, the measurement-updated angle estimate $\phi^{(+)}$ at the current time instant is derived by summing the time-updated angle estimate $\phi^{(-)}$ at the current time instant with a blended proportion of the difference between the accelerometer-based angle estimate $\phi^a$ and the time-update angle estimate $\phi^{(-)}$ at the current time instant. Accordingly, the difference between the accelerometer-based angle estimate $\phi^a$ and time-updated angle estimate $\phi^{(-)}$ is multiplied by the blending coefficient K which may be variable between a value of zero and one.

It is preferred that during either a rough road condition or an airborne condition, the blending coefficient K be set to zero, so as to nullify the effect sensed by the accelerometers. Accordingly, the measurement-updated angle estimate $\phi^{(+)}$ represents the overall angle estimate which is provided as the output of the blending process. From the above-equation, it should be appreciated that $\phi^{(+)} = \phi^{(-)}$ when the blending coefficient K is set to zero. Accordingly, the measurement-updated angle estimate $\phi^{(+)}$ is used if a filtered estimate is desired, i.e., one which depends on data available up to and including the current time instant, while the time-updated angle estimate $\phi^{(-)}$ is used if a predicted estimate is desired for only data prior to the current time instant.

The blending scheme of the present invention effectively integrates the angular rate sensed signal over the last time interval, adds it into the previous overall angle estimate, and then slightly corrects the new estimate towards the acceleration-based angle estimate at the current time instant. The blending coefficient K adjusts the fractional level of this correction such that, at the extremes, if K equals zero, the acceleration-based estimate is ignored, and if K equals one the angular rate sensed signal is ignored. If the blending coefficient K is small, errors in the acceleration-based estimate are effectively low-pass filtered. If the angular rate sensor 12 and accelerometers 14 and 20 agree on the rapidly-changing roll angle, there is no filtering lag associated with the blending. In addition, an unknown angular rate sensor bias leads to a constant error in the overall angle estimate, instead of an ever-increasing error. Accordingly, the blending coefficient trades off between the bandwidth of the low-pass filtering of the acceleration-based estimate and the gain from the angular rate sensor bias to the consequent angular estimation error. The heavier the low-pass filtering, the larger the error produced by an unknown angular rate sensor bias. Accordingly, the blending coefficient K may be allowed to vary in time, depending on the output of the rough road detection circuit and the airborne detection circuit, and used to determine the overall attitude angle of the vehicle.

Figure 3:
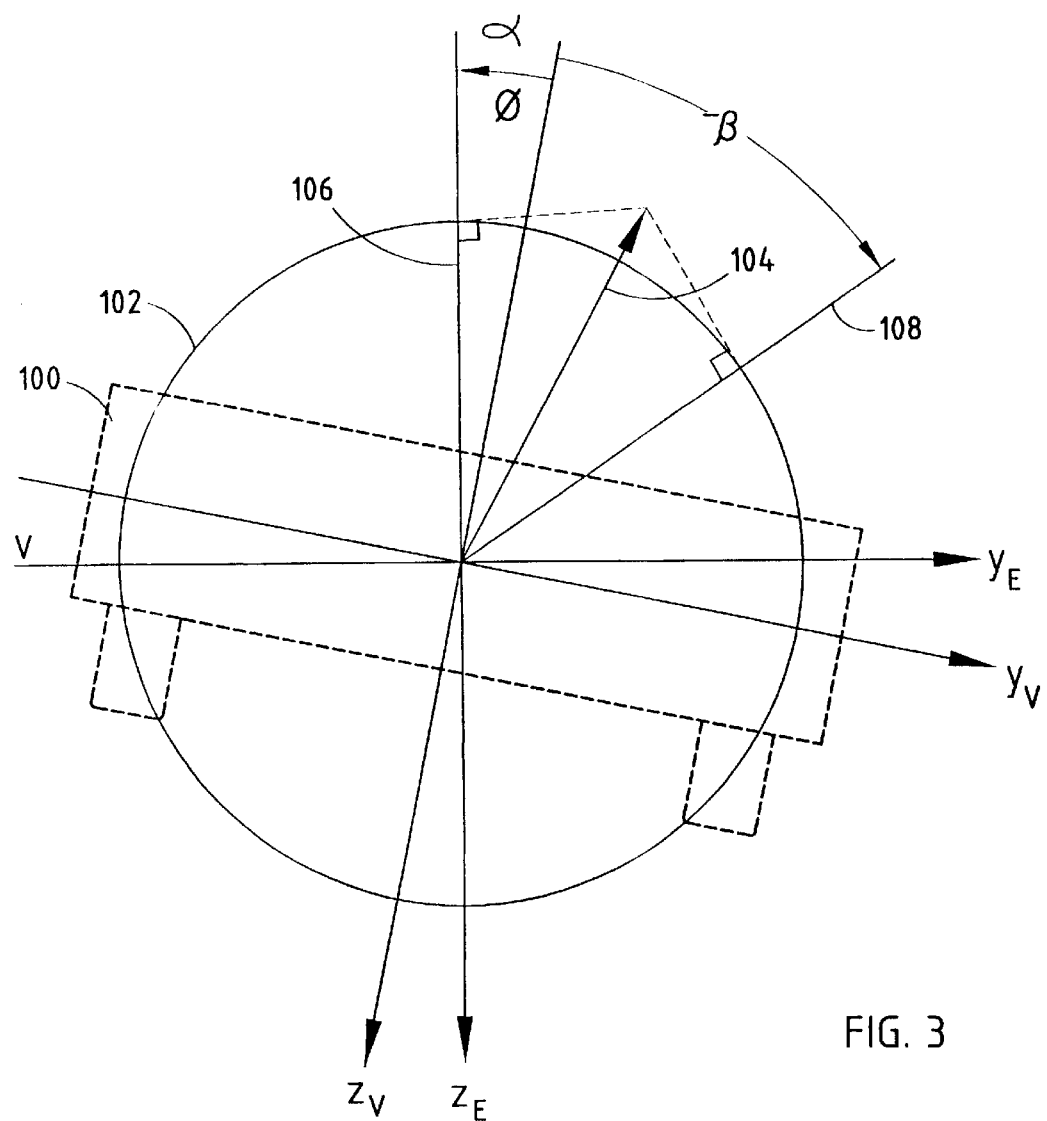
FIG. 3 is a schematic diagram illustrating the vehicle and Earth-based coordinates and vectors that illustrate estimation of the roll angle.

A vehicle 100 is generally shown in FIG. 3 oriented at a roll angle relative to an Earth-based coordinate system. The Earth-based coordinate system includes a vertical axis $Z_E$ and a lateral axis $Y_E$. The vehicle 100 is oriented on a vehicle-based axis system having a vertical axis $z_v$ and a lateral axis $y_v$. It should be appreciated that the total acceleration vector sensed by the accelerometer is composed of a 1G gravitational acceleration vector pointing straight upward (vertical) in the Earth-based reference frame, and some level of Earth-horizontal maneuver (i.e., inertial) acceleration. For purposes of description of the present invention, it is assumed that the vehicle's pitch angle and yaw angle are approximately zero. If there is no maneuver acceleration, then the total acceleration vector will have a length of 1G. If there is a non-zero maneuver acceleration, then the total acceleration vector will have a length greater than 1G. For purposes of illustration, the unit circle 102 represents a 1G acceleration force. When the measured acceleration vector has a magnitude of 1G, then an arc tangent calculation can be preformed to determine the angle between the vehicle's vertical axis $z_v$ and the measured gravity vector $Z_E$ to provide the roll angle $\phi$. In situations where the total acceleration vector 104 magnitude is greater than 1G, a calculation is made to determine the magnitude of the inertial acceleration that adds orthogonally to the gravity vector to give a vector of the measured length. Two possible roll angles then result, as shown by angles $\alpha$ and $\beta$, depending on whether the inertial acceleration is assumed to be positive or negative (i.e., if the vehicle is turning right or left, respectively). As shown, the measured acceleration vector 104 results in a first vector 106 at an angle $\alpha$ and a second vector 108 at an angle $-\beta$. Because $\alpha$ is closer to the blended roll angle estimate, $\alpha$ is selected as the roll angle, unless otherwise overridden by the roll estimate algorithm.

Figure 4A:
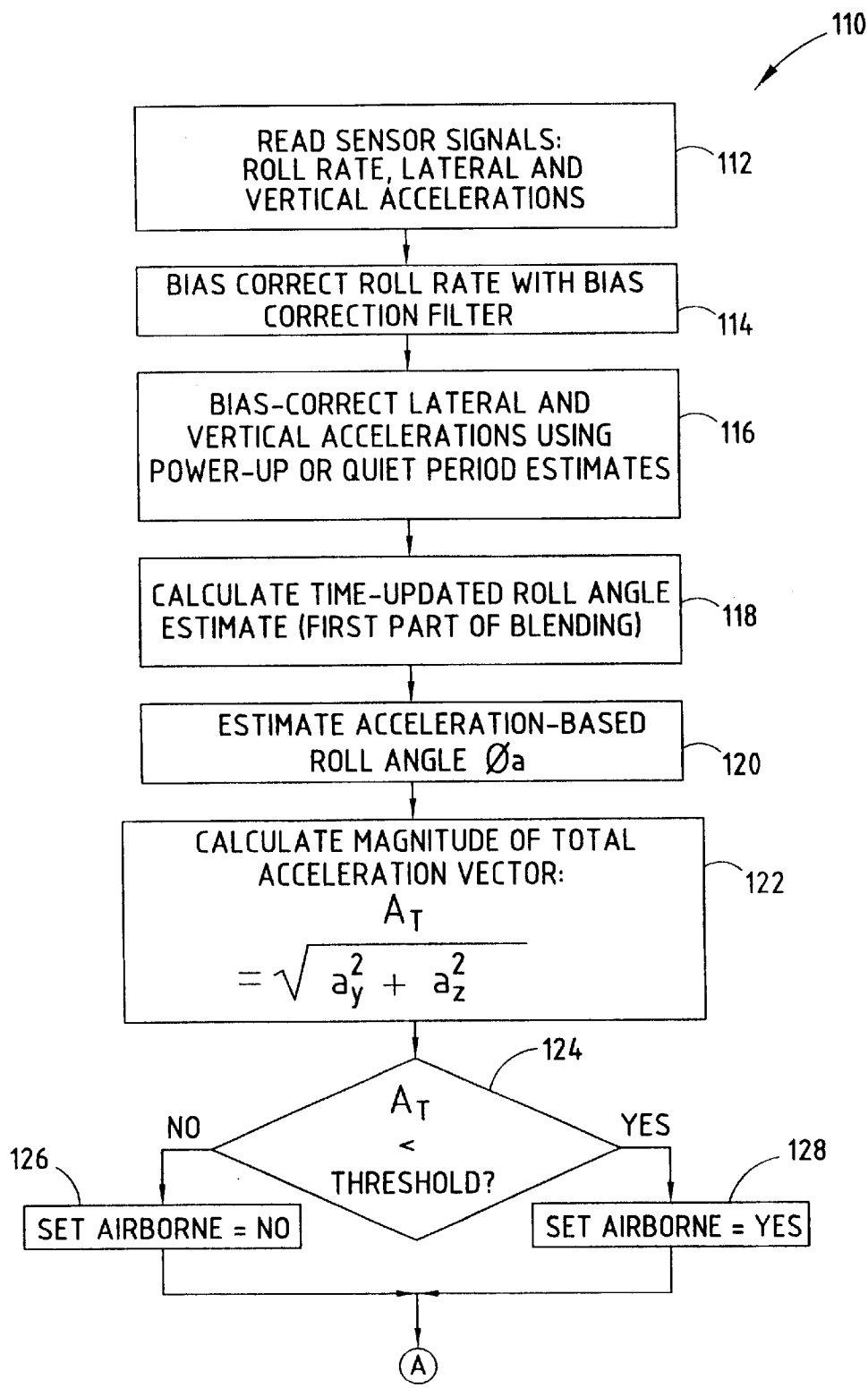
FIGS. 4A and 4B are flow diagrams illustrating a methodology of estimating the roll angle of a vehicle according to the present invention.
Figure 4B:
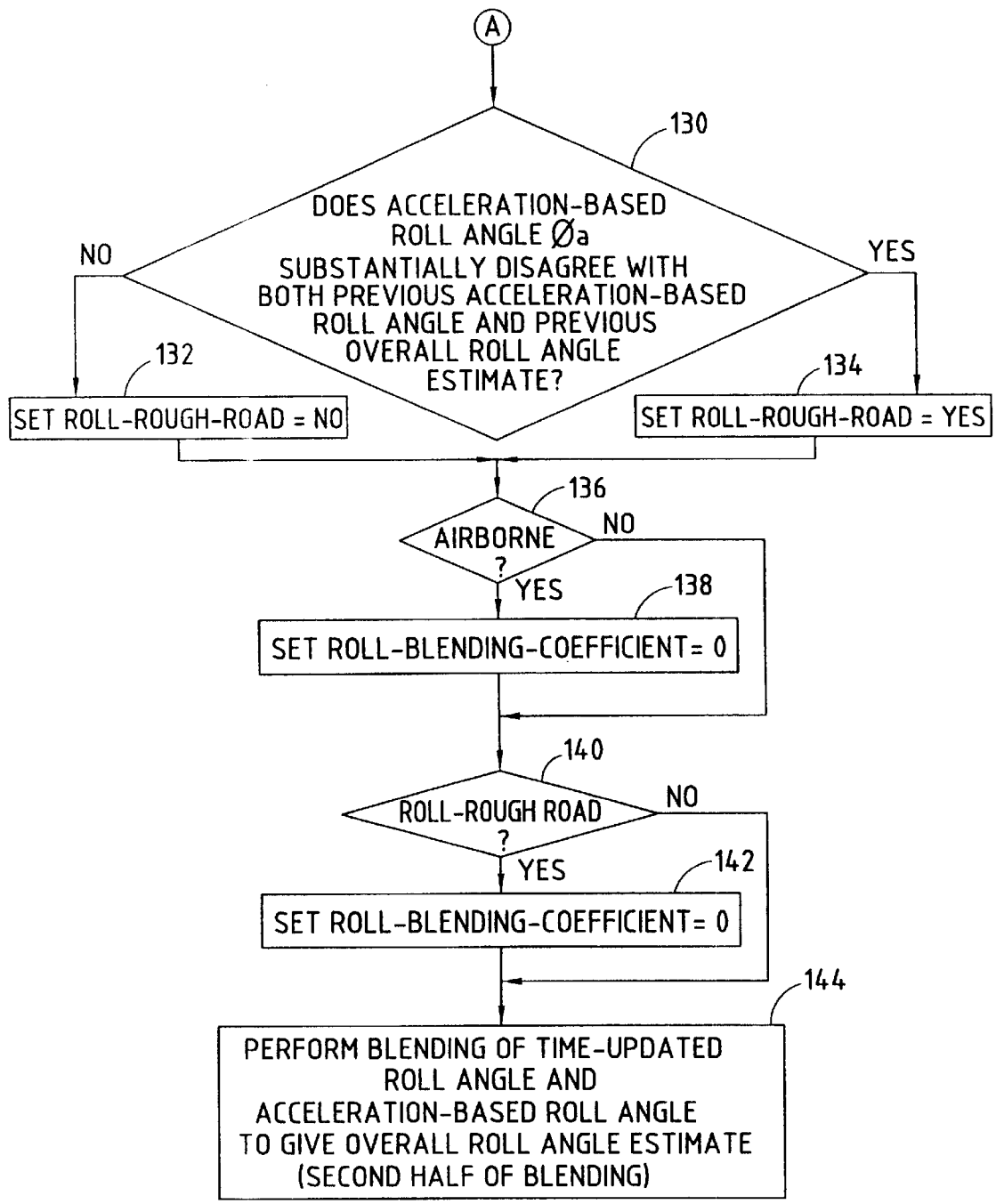

Referring now to FIGS. 4A and 4B, a methodology 110 of estimating a roll angle of the vehicle is illustrated therein. In step 112, roll angle estimation methodology 110 reads the sensor signals including the roll rate signal and the lateral and vertical acceleration signals. In step 114, the roll rate signal is bias corrected with a bias correction filter. In step 116, the lateral and vertical acceleration signals are each bias corrected using power-up or quiet period bias estimates.

Proceeding to step 118, methodology 100 calculates the time-updated roll angle estimate as a function of the sensed roll angular rate signal, which is used in the blending process. In step 120, the acceleration-based roll angle $\phi^a$ is estimated according to an algorithm shown in FIGS. 5A and 5B as a function of the sensed vertical and lateral accelerations. Next, in step 122, the magnitude of the total acceleration vector is calculated by computing the square root of the sum of the vertical acceleration squared and the lateral acceleration squared.

Once the total acceleration vector is computed, methodology 100 compares the total acceleration to a threshold in decision step 124 and, if the total acceleration is more than the predetermined threshold, an airborne flag is set to no in step 126. If the total acceleration is less than the predetermined threshold, the airborne flag is set to yes in step 128. In addition, methodology 100 determines if the acceleration-based roll angle $\phi^a$ substantially disagrees with both the previous acceleration-based roll angle and the previous overall roll angle estimate. If the condition in decision block 130 is met, the roll rough road flag is set to yes in step 134. Otherwise, the roll rough road flag is set to no in step 132. Further, decision step 136 checks for whether an airborne condition is present and, if so, sets the roll blending coefficient K to zero in step 138. Similarly, decision step 140 checks for whether a roll rough road condition is present and, if so, sets the roll blending coefficient K to zero in step 142. Finally, roll angle estimate methodology 110 performs blending of the time-updated roll angle and acceleration-based roll angle in step 144 to obtain the overall roll angle estimate, thereby completing one cycle of roll angle estimation methodology 110.

Figure 5A:
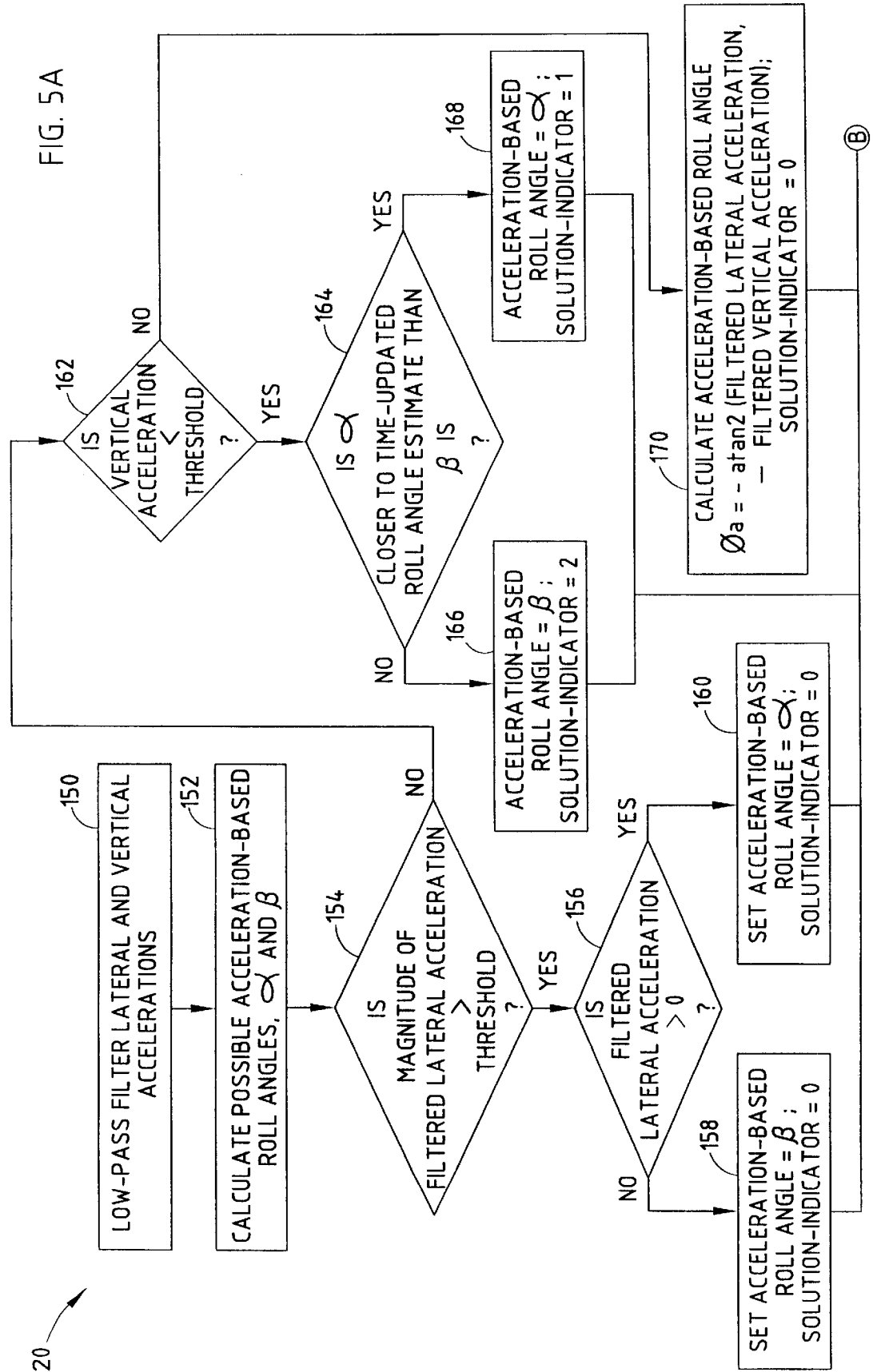
FIGS. 5A and 5B are flow diagrams illustrating a methodology of estimating the acceleration-based roll angle.
Figure 5B:
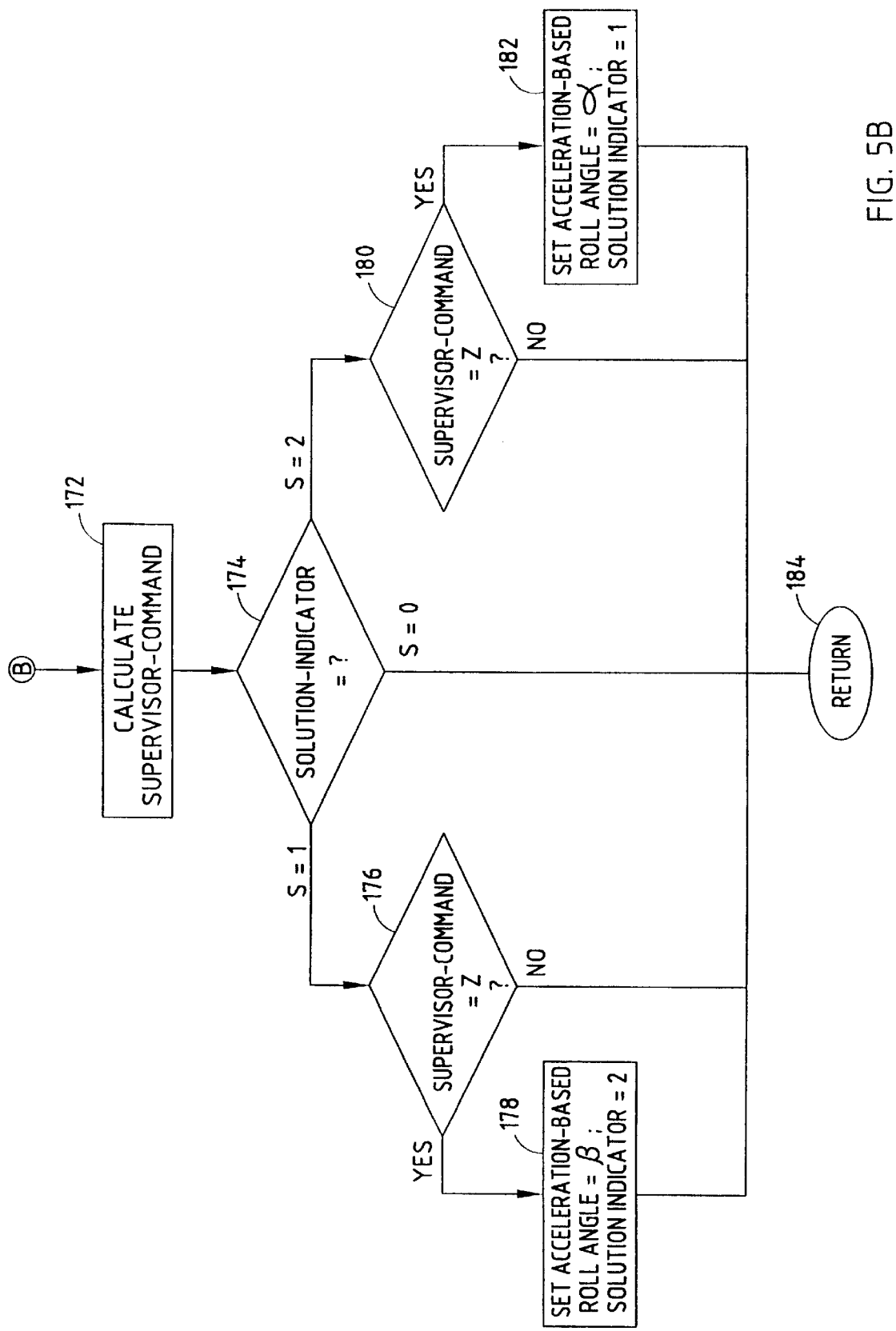

Referring to FIGS. 5A and 5B, the methodology 120 for estimating the acceleration-based roll angle $\phi^a$ will be described below. Methodology 120 includes step 150 of low-pass filtering the lateral and vertical acceleration signals, and step 152 of calculating the possible acceleration-based roll angles $\alpha$ and $\beta$. The possible acceleration-based roll angles $\alpha$ and $\beta$ are calculated by measuring the total acceleration of the vehicle and, assuming that the Earth-vertical acceleration is purely gravitational and thus equal to −1G, the calculation of the lateral acceleration can be computed. Assuming a non-zero level of maneuver acceleration, the magnitude of the measured acceleration should exceed 1G, and therefore the total acceleration vector will extend outside of the unit circle shown in FIG. 3. Two possible gravity vector locations are found by drawing tangents to the circle from the tip of the measured acceleration vector, thereby representing the measured acceleration as the sum of the 1G vector and orthogonal vector having a length $A_y$. The angle between each hypothesized gravity vector and the negative part of the vehicle's vertical Z-axis $z_v$ is a possible roll angle. One solution requires a positive level of maneuver acceleration $A_y$ (i.e., a right turn), and the other solution requires a negative level (i.e., a left turn). The two angle solutions for this case of $|A_y|>0$ is referred to as $\alpha$ and $\beta$ as provided in the following equations.

In the event of zero maneuver acceleration (i.e., $A_y=0$), the single roll angle solution may be provided by the following equation:

$\alpha=\beta=-a\tan 2(a_y,-a_z)$.

In the event of zero maneuver acceleration, the measured total acceleration vector lies on the unit circle. Under the assumptions provided herein, the tip of the measured acceleration vector should not lie inside the circle. However, it may lie inside some of the time due to violations of the assumptions and to possible measurement errors (e.g., bias and noise) in the accelerometers.

Once the possible acceleration-based roll angles $\alpha$ and $\beta$ are determined, methodology 120 proceeds to decision step 154 to determine if the magnitude of the filtered lateral acceleration exceeds a predetermined threshold. If the magnitude of the filtered lateral acceleration exceeds the threshold, methodology 120 proceeds to decision step 156 to determine if the filtered lateral acceleration exceeds zero. Otherwise, methodology 120 proceeds to step 162 to check if the vertical acceleration is less than the predetermined threshold. In decision step 156, if the filtered lateral acceleration exceeds zero, methodology 120 sets the acceleration-based roll angle to $\beta$ and the solution indicator equal to zero in step 158. If the filtered lateral acceleration does not exceed zero, then the acceleration-based roll angle $\phi^a$ is set equal to $\alpha$, and the solution indicator is set to zero in step 160.

In decision step 162, if the vertical acceleration is less than the predetermined threshold, methodology 120 proceeds to decision step 164 to check if angle $\alpha$ is closer to the time-updated roll angle estimate than angle $\beta$ and, if so, the acceleration-based roll angle $\phi^a$ is set equal to $\alpha$, and the solution indicator is set equal to one in step 168. If $\alpha$ is not closer to the time-updated roll angle than $\beta$, the acceleration-based roll angle $\phi^a$ is set equal to $\beta$, and the solution indicator is set equal to two in step 166.

If the sensed vertical acceleration signal is not less than the predetermined threshold in decision step 162, methodology 120 proceeds to step 170 to calculate the acceleration-based roll angle $\phi^a$ as a function of the filtered lateral acceleration and filtered vertical acceleration signals, and further sets the solution indicator equal to zero.

Additionally, methodology 120 includes step 172 of calculating a supervisor command which is discussed in further detail below in connection with FIGS. 6A and 6B. Following the supervisor command calculation, decision step 174 compares the solution indicator to possible values. If the solution indicator(s) equals zero, methodology 120 is complete and returns in step 184. If the solution indicator equals one, methodology 120 proceeds to decision step 176 to check if the supervisor command is set equal to two and, if not, proceeds to return step 184. If the supervisor command equals two, the acceleration-based roll angle $\phi^a$ is set equal to $\beta$, and the solution indicator is set equal to two in step 178. If the solution indicator is set equal to two in decision step 174, decision step 180 checks if the supervisor command is equal to one and, if not, proceeds to return step 184. If the supervisor command is set equal to one, the acceleration-based roll angle $\phi^a$ is set equal to $\alpha$ in step 182, and the solution indicator is set equal to one in step 182, before proceeding to return step 184.

Figure 6A:
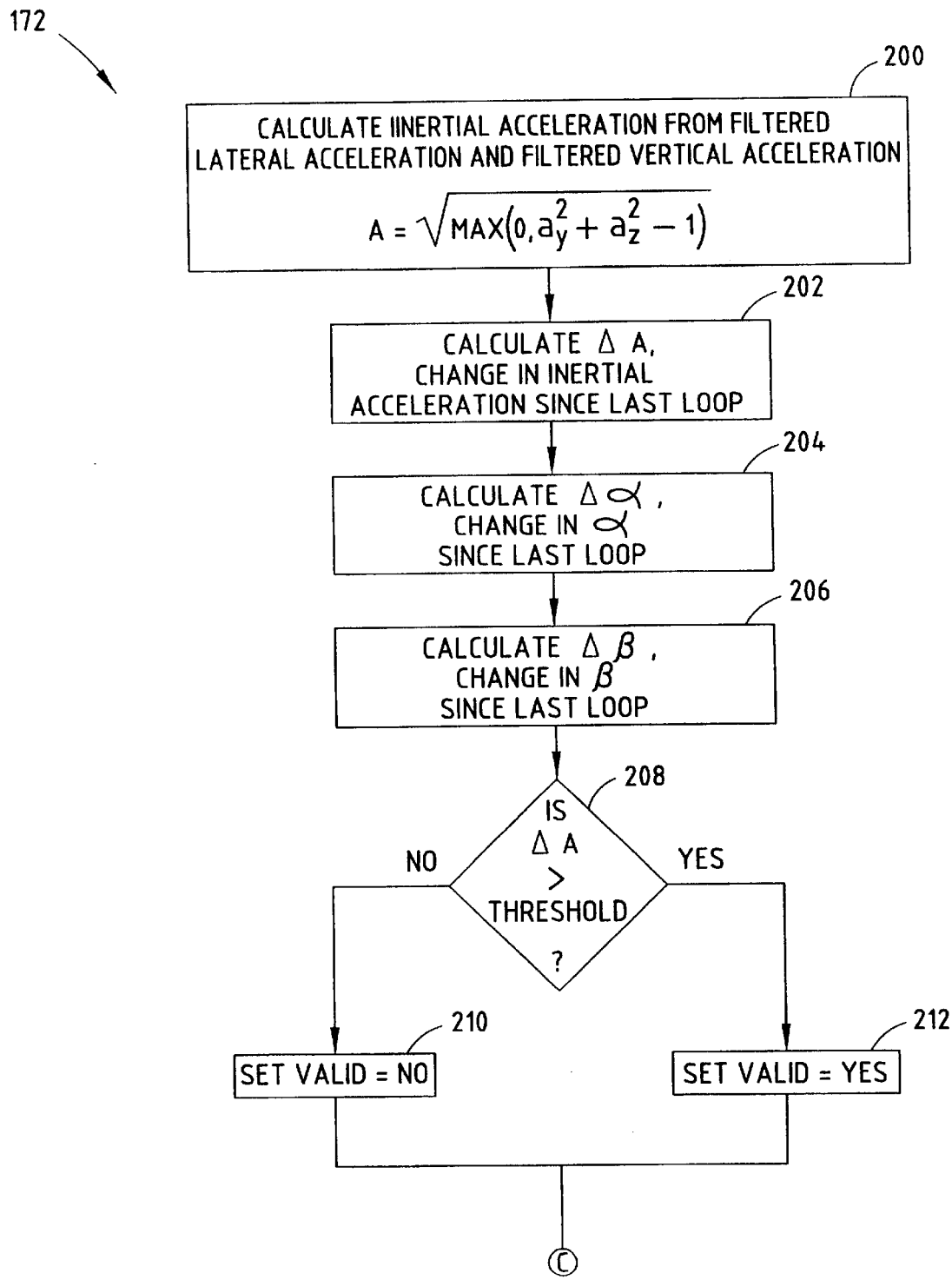
FIGS. 6A and 6B are flow diagrams illustrating a methodology of calculating a supervisory command.
Figure 6B:
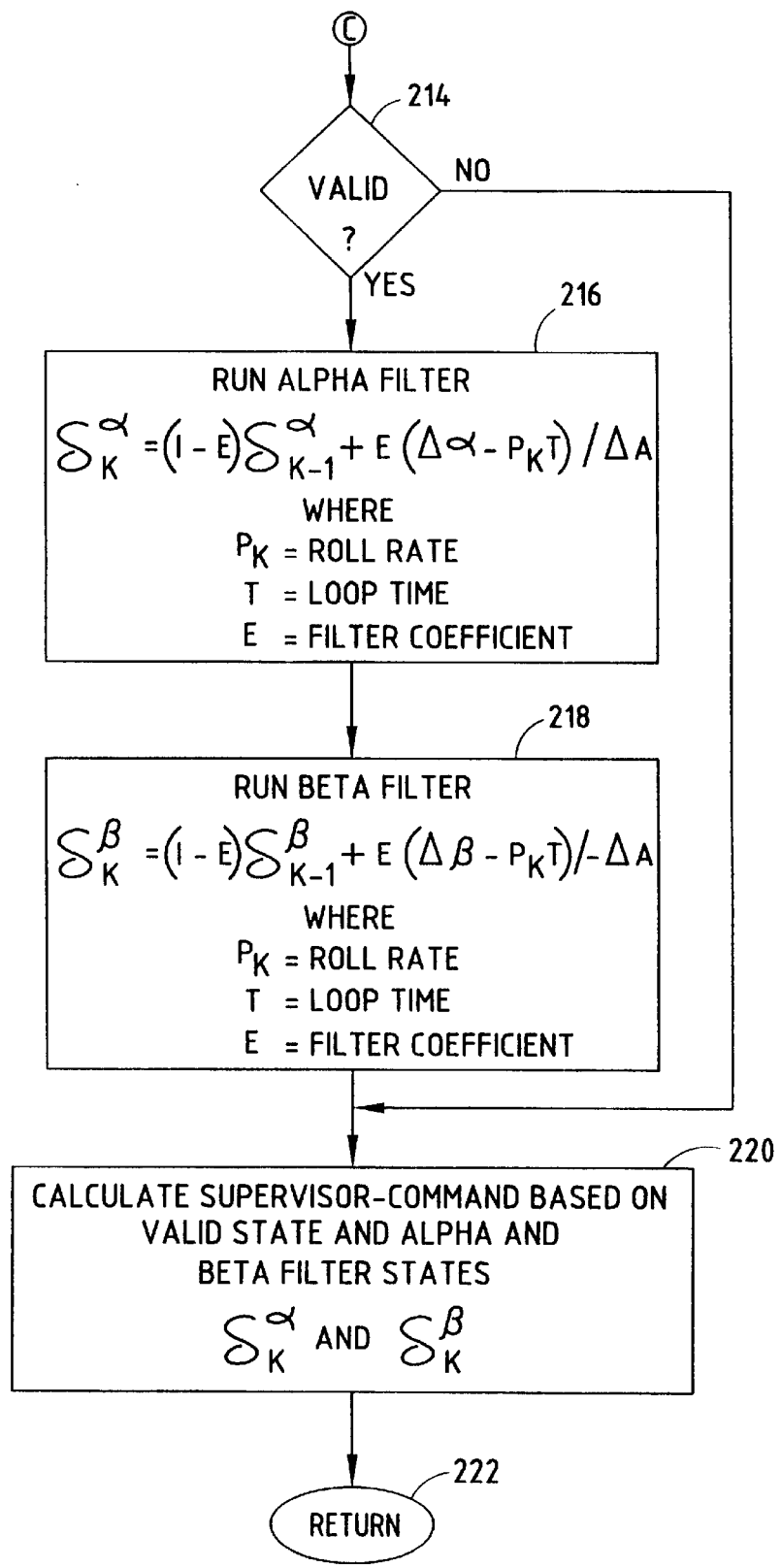

Referring to FIGS. 6A and 6B, the supervisor command routine 172 is illustrated therein. Supervisor command routine 172 includes step 200 of calculating the inertial acceleration from the filtered lateral acceleration and filtered vertical acceleration (A) according to the equation shown. Next, in step 202 the change in inertial acceleration ($\Delta$A) since the last loop is determined. In step 204, the change in $\alpha$ ($\Delta\alpha$) is calculated since the last loop. Likewise, the change in $\beta$ ($\Delta\beta$) since the last loop is calculated in step 206. In decision step 208, the change in inertial acceleration ($\Delta$A) is compared to a predetermined threshold. If the change in acceleration $\Delta$A does not exceed a predetermined threshold, the valid flag is set equal to no in step 210. Otherwise, if the change in acceleration $\Delta$A is greater than the predetermined threshold, the valid flag is set equal to yes in step 212. Decision step 214 checks for the valid condition and, if equal to yes, proceeds to step 216 to run the $\alpha$ filter, and to step 218 to run the $\beta$ filter. The $\alpha$ filter computes a sensitivity of angle $\alpha$ referred to as $\delta_K^\alpha$, and the $\beta$ filter computes a sensitivity of angle β referred to as $\delta_K^\beta$. Finally, the supervisor command is calculated based on the valid α and β filter states and filter outputs in step 220. One approach to interpret the correct output α or β is to require that one sensitivity $\delta_K^\alpha$ or $\delta_K^\beta$ be clearly lower than the other, e.g., at least 0.2 lower. Another interpretation approach may require that one sensitivity be above a threshold, and the other sensitivity to be below another threshold simultaneously, in order for a clear decision to be declared. Thereafter, the supervisor command routine 172 proceeds to return step 222.

The roll angle estimate approach described herein provides a way to override the branch-following solution choice when it becomes clear which solution is correct. When the magnitude of the measured lateral acceleration exceeds a threshold, the maneuver (inertial) acceleration must have the same sign as a measured lateral acceleration, and thus the choice of α or β becomes more clear. Physically realizable sustained driving conditions can be mapped out on a plot which shows how the measured lateral acceleration is related to the roll angle for various levels of maneuver acceleration. Under such a plot, each curve may represent a certain level of maneuver acceleration selected from a given set.

Accordingly, the present invention provides for a roll angle estimator and method of estimating the roll angle of a vehicle using a vertical accelerometer, a lateral acceleration, and an angular roll rate sensor. In addition, the present invention provides for a roll angle estimate employing a blending of the acceleration-based roll angle and the time-updated angle that is computed from the roll angular rate sensor. Thus, a roll angle estimate is achieved employing only three sensors.

Accordingly, when a vehicle is traveling in a straight line on a level road and enters a curve causing a maneuver inertial acceleration, a roll angle of the vehicle will generally be generated. On the straightaway, the maneuver acceleration is generally zero, the roll angular rate is zero, and the measured acceleration vector results in an acceleration-based angle of zero which is used to measurement-update the overall estimate. The overall roll angle estimate is therefore zero prior to the turn entry. Upon entering the turn, as the maneuver acceleration builds up, the vehicle will generally begin to roll and the tip of the measured acceleration vector will move outside of the unit circle, thus creating two possible angle solutions α and β, one of which represents the true roll angle. In the time-updating process, the roll rate signal is integrated, effectively moving the roll angle estimate closer to the true roll angle. This time-updated estimate is then compared to the possible angle solutions α and β, and the correct angle solution α or β which is closer is selected for use in the measurement update. Thus, the closer angle α or β is employed to measurement update the time-updated roll angle estimate based on the blending operation. Should the vehicle experience a rough road condition or airborne condition, the blending coefficient is set to zero, thus removing the acceleration-based angle estimate from the equation. Further, the measurement update may be overridden based on other criteria as discussed above.

It will be understood by those who practice the invention and those skilled in the art, that various modifications and improvements may be made to the invention without departing from the spirit of the disclosed concept. The scope of protection afforded is to be determined by the claims and by the breadth of interpretation allowed by law.

The invention claimed is:

1. A vehicle attitude angle estimator for use in a vehicle, said angle estimator comprising:
    a first accelerometer for sensing vertical acceleration of the vehicle and producing an output signal indicative thereof;
    a second accelerometer for sensing a horizontal acceleration of the vehicle and producing an output signal indicative thereof; and
    a controller for determining an acceleration-based attitude angle as a function of the sensed vertical acceleration and horizontal acceleration, wherein the acceleration-based attitude angle is determined absent a sensed angular attitude rate, said controller producing an attitude angle estimate as a function of the acceleration-based attitude angle.

2. The vehicle attitude angle estimator as defined in claim 1 further comprising an angular attitude rate sensor for sensing angular attitude rate of the vehicle and producing an output signal indicative thereof, wherein the controller produces the attitude angle estimate further as a function of the sensed attitude rate.

3. The vehicle attitude angle estimator as defined in claim 2, wherein the controller further provides a blending coefficient and generates the vehicle attitude angle estimate further as a function of the blending coefficient.

4. The vehicle attitude angle as defined in claim 3, wherein the blending coefficient has a value in the range of 0 to 1.

5. A vehicle attitude angle estimator for use in a vehicle, said angle estimator comprising:
    an angular attitude rate sensor for sensing angular attitude rate of a vehicle and producing an output signal indicative thereof;
    a first accelerometer for sensing vertical acceleration of the vehicle and producing an output signal indicative thereof;
    a second accelerometer for sensing a horizontal acceleration of the vehicle and producing an output signal indicative thereof; and
    a controller for producing an attitude angle estimate as a function of said sensed attitude rate, said sensed vertical acceleration, and said sensed horizontal acceleration, wherein said controller determines an acceleration-based attitude angle as a function of the sensed vertical acceleration and horizontal acceleration, said controller further providing a blending coefficient and generating a current vehicle attitude angle estimate as a function of the updated attitude angle estimate, said acceleration-based attitude angle, and said blending coefficient.

6. The vehicle attitude angle estimator as defined in claim 5, wherein said angular attitude rate sensor comprises an angular roll rate sensor for sensing angular roll rate, and said second accelerometer comprises a lateral accelerometer for sensing lateral acceleration.

7. The vehicle attitude angle estimator as defined in claim 6, wherein said controller produces a roll angle estimate and updates the roll angle estimate as a function of the sensed angular roll rate, said controller determining an acceleration-based roll angle as a function of the sensed lateral and vertical accelerations, said controller further providing a roll blending coefficient and generating a current vehicle roll angle estimate by further updating the roll angle estimate as a function of the acceleration-based roll angle and the roll blending coefficient.

8. The vehicle angle estimator as defined in claim 5, wherein said controller generates the vehicle attitude angle estimate by multiplying a blending coefficient by the difference between the acceleration-based angle estimate and the updated attitude angle estimate, said controller further adding the multiplication to the updated attitude angle estimate.

9. The vehicle angle estimator as defined in claim 5, wherein said second accelerometer comprises a lateral accelerometer for sensing lateral acceleration.

10. A vehicle attitude angle estimator for use in a vehicle, said vehicle angle estimator comprising:

an angular attitude rate sensor for sensing angular attitude rate of a vehicle and producing an output signal indicative thereof;

a vertical accelerometer for sensing vertical acceleration of the vehicle and producing an output signal indicative thereof;

a lateral accelerometer for sensing lateral acceleration of the vehicle and producing an output signal indicative thereof; and a controller for producing an attitude angle estimate and updating the attitude angle estimate as a function of said sensed angular attitude rate, said controller determining an acceleration-based attitude angle as a function of said sensed lateral and vertical accelerations, said controller further providing a blending coefficient and generating a current vehicle attitude angle estimate as a function of said updated attitude angle estimate, said acceleration-based attitude angle, and the blending coefficient.

11. The vehicle angle estimator as defined in claim 10, wherein said controller generates the vehicle attitude angle estimate by multiplying a blending coefficient by the difference between the acceleration-based angle estimate and the updated attitude angle estimate, said controller further adding the multiplication to the updated attitude angle estimate.

12. A method for estimating an attitude angle of a vehicle, said method comprising the steps of:

sensing vertical acceleration of the vehicle and producing an output signal indicative thereof;

sensing horizontal acceleration of the vehicle and producing an output signal indicative thereof;

determining an acceleration-based attitude angle as a function of said sensed vertical and horizontal accelerations, wherein the acceleration-based attitude angle is determined absent a sensed angular attitude rate; and generating a vehicle attitude angle estimate as a function of the acceleration-based attitude angle.

13. The method as defined in claim 12 further comprising the step of sensing angular attitude rate of a vehicle and producing an output signal indicative thereof, and wherein the step of generating a vehicle attitude angle estimate comprises generating the vehicle attitude angle estimate further as a function of the sensed angular attitude rate.

14. The method as defined in claim 13 further comprising the step of providing a blending coefficient, wherein the step of generating the vehicle attitude angle estimate comprises the vehicle attitude angle estimate further as a function of the blending coefficient.

15. The method as defined in claim 14, wherein the blending coefficient has a value in the range of 0 to 1.

16. A method for estimating an attitude angle of a vehicle, said method comprising the steps of:

sensing angular attitude rate of a vehicle and producing an output signal indicative thereof;

sensing vertical acceleration of the vehicle and producing an output signal indicative thereof;

sensing horizontal acceleration of the vehicle and producing an output signal indicative thereof;

generating a vehicle attitude angle estimate as a function of the sensed angular attitude rate, vertical acceleration, and horizontal acceleration;

updating said attitude angle estimate as a function of said sensed angular attitude rate;

determining an acceleration-based attitude angle as a function of said sensed vertical and horizontal accelerations;

providing a blending coefficient; and generating the current vehicle attitude angle estimate as a function of said updated attitude angle estimate, said acceleration-based attitude angle and said blending coefficient.

17. The method as defined in claim 16, wherein said step of updating said attitude angle estimate includes a step of integrating said sensed angular attitude rate over a time period and adding said integration with said attitude angle estimate.

18. The method as defined in claim 16, wherein said step of generating said vehicle attitude angle estimate further comprises multiplying said blending coefficient by the difference between said acceleration-based angle estimate and said updated attitude angle estimate, and further adding said multiplication to said updated angle estimate.

19. The method as defined in claim 16, wherein said step of sensing horizontal acceleration comprises sensing lateral acceleration of the vehicle and said step of generating a current vehicle attitude angle estimate comprises generating a current vehicle roll angle estimate.

20. The method as defined in claim 16, wherein said attitude angle comprises a roll angle, and said sensed attitude rate comprises an angular roll rate, and said sensed horizontal acceleration comprises a lateral acceleration.

21. A method for estimating an attitude angle of a vehicle, said method comprising the steps of:

sensing angular attitude rate of a vehicle and producing an output signal indicative thereof;

providing a blending coefficient;

sensing vertical acceleration of the vehicle and producing an output signal indicative thereof;

sensing horizontal acceleration of the vehicle and producing an output signal indicative thereof; and generating a vehicle attitude angle estimate as a function of the sensed angular attitude rate, vertical acceleration, horizontal acceleration, and said blending coefficient, wherein said blending coefficient has a value in the range of 0 to 1.

* * * * *